United States Patent
Foucher et al.

(10) Patent No.: US 7,625,176 B2
(45) Date of Patent: Dec. 1, 2009

(54) PLAIN BEARING BETWEEN TWO PARTS WHICH ARE MOVABLE WITH RESPECT TO EACH OTHER

(75) Inventors: Christelle Foucher, Acigne (FR); Veronique Christiane Giffard, Saint Vrain (FR); Claude Marcel Mons, Savigny le Temple (FR)

(73) Assignee: SNECMA, Paris (FR)

( * ) Notice: Subject to any disclaimer, the term of this patent is extended or adjusted under 35 U.S.C. 154(b) by 455 days.

(21) Appl. No.: 11/279,822

(22) Filed: Apr. 14, 2006

(65) Prior Publication Data
US 2006/0237100 A1 Oct. 26, 2006

(30) Foreign Application Priority Data
Apr. 21, 2005 (FR) .................................. 05 51027

(51) Int. Cl.
*F04D 29/046* (2006.01)
*B21D 53/10* (2006.01)
*F16C 33/00* (2006.01)

(52) U.S. Cl. ..................... 415/160; 384/625; 29/898.13
(58) Field of Classification Search ................. 384/625; 29/898.13
See application file for complete search history.

(56) References Cited

U.S. PATENT DOCUMENTS 5,302,032 A * 4/1994 Niwa et al. ................. 384/454
5,735,603 A 4/1998 Kesig et al.
6,271,612 B1 * 8/2001 Tanaka et al. ................. 310/90
6,341,896 B1 * 1/2002 Miura et al. ................. 384/115
2003/0170115 A1 * 9/2003 Bowen et al. ............... 415/160

FOREIGN PATENT DOCUMENTS

| DE | 88 12 264 U1 | 12/1988 |
| EP | 0 299 854 | 1/1989 |
| EP | 0 579 522 A1 | 1/1994 |
| EP | 0579522 A1 * | 1/1994 |
| JP | 10176204 A * | 6/1998 |

* cited by examiner

*Primary Examiner*—Richard Edgar
(74) *Attorney, Agent, or Firm*—Oblon, Spivak, McClelland, Maier & Neustadt, P.C.

(57) ABSTRACT

The present invention relates to a plain bearing between two parts movable with respect to each other, the first part having a first bearing element made from a first metal and the second part having a second bearing element made from a second metal of higher hardness. The first bearing element has a surface layer hardened by strain hardening. As a result of the invention, the wear between the parts can be reduced and their life can be substantially lengthened. The invention can be advantageously applied to cases in which the first part is a variable-setting diffuser blade and the second part is a gas turbine casing.

20 Claims, 2 Drawing Sheets

PLAIN BEARING BETWEEN TWO PARTS WHICH ARE MOVABLE WITH RESPECT TO EACH OTHER

FIELD OF THE INVENTION

The present invention relates to a set of two parts which are movable with respect to each other, and it proposes the strengthening of their surfaces which are in contact with each other and which form a plain bearing. In particular, it relates to the bearings in a variable-setting diffuser system, particularly in a gas turbine.

BACKGROUND OF THE INVENTION

An articulated system, such as the variable-setting diffuser blades of a gas turbine engine compressor, comprises parts moving with respect to each other. FIG. 1 shows schematically a variable-setting diffuser blade 1 mounted rotatably in the engine casing 3. The blade comprises a vane 12, a platform 13 and a root forming a pivot 14. The pivot 14 is housed in a radial bore or aperture formed in the casing 3, using sleeves 4 and 5 which are in sliding contact with the root forming the pivot 14. A washer 15 retains the blade in its housing. A lever 16, itself actuated by members which are not shown, causes the blade to rotate about the axis XX of the root to bring it into the required position with respect to the flow of air passing over the vane. The relative movements result from the sliding of the surfaces in contact which form a plain bearing, in this case the root and the sleeves. When the engine is running, it is found that the stresses to which the parts are subjected expose the contact surfaces to a degree of wear which can lead to losses of functionality of the system. The rate at which the contact surfaces become degraded depends on numerous parameters, the principal ones of which are related to the operating temperature, the contact pressure, the amplitude of the relative movements, and the environment.

In the case of a variable setting mechanism for gas turbine blades, a particular constraint is the requirement of operation in a non-lubricated environment. Only dry lubrication can be envisaged in this case to improve the contact conditions.

The materials used for diffuser blades are titanium alloys, steels, or nickel alloys. The casing material is generally a steel or a titanium alloy. The materials used for the sleeves are generally chosen from two groups, namely organic materials and inorganic materials. It is preferable to use organic materials if the temperature conditions permit, in other words at temperatures below 300-400° C., while inorganic bases are preferred at higher temperatures. All the wear prevention systems known at present have a limited life.

There is a need to provide new solutions which would increase the operating life of variable-setting diffuser mechanisms, and more generally the life of sets or pairs of parts which are in sliding contact with each other in the form of a plain bearing, during the operation of a machine.

The applicant's aim is to provide parts having surfaces forming plain bearing elements in which the wear is reduced, and in particular to propose new pairs of wear-resistant materials.

In particular, the applicant's aim is to resolve the problem of wear in the contact between the diffuser root and the sleeve, and to significantly increase the life of the variable-setting devices by proposing an inexpensive solution.

SUMMARY OF THE INVENTION

According to the invention, these objects are achieved with a plain bearing between two parts moving with respect to each other, the first part having a second bearing element made from a second metal different from the first metal and with a greater hardness, characterized in that the first bearing element has a strain-hardened surface layer.

A strain-hardenable material is a material whose mechanical properties are enhanced by cold plastic deformation.

In particular, the metal of the first bearing element is an austenitic steel and the metal of the second bearing element is a martensitic steel.

The first element can be strain-hardened by using known methods. These consist of prestressing shot-blasting, burnishing and HIF banding. If necessary, the surface hardness can be increased further by appropriate heat treatment, particularly holding at a temperature below the tempering temperature of the material. The purpose of this treatment is to divide the size of the previously strain-hardened grains.

According to another characteristic, a varnish such as a graphite varnish is applied to one or other of the contact surfaces to facilitate their running-in.

In a particular application, the first part comprises a pivot journaled in a bore or aperture formed in a second part. In particular, the invention can be very advantageously applied in the case where the first part is a variable-setting diffuser blade and the second part is a gas turbine casing.

In one embodiment, the pivot is fixed to a band forming the said first strain-hardened bearing element and the bore comprises a sleeve forming the said second bearing element. The latter is made, for instance, from martensitic steel with high hardness.

In another embodiment, the pivot is fixed to a band forming the said second bearing element, made for instance from martensitic steel of high hardness, and the bore comprises a sleeve forming the said first bearing element made from austenitic steel having a lower intrinsic hardness than the martensitic steel but having a hardened surface.

In the particular case in which the diffuser blade has a platform, and is made from austenitic steel, the latter is treated by strain hardening in such a way that it forms a layer which constitutes the said first bearing element in contact with a sleeve which is mounted in the bore and is made from steel of high hardness.

In yet another embodiment, the pivot of the variable-setting diffuser blade, made for instance from austenitic steel, is treated in such a way as to form the said first strain-hardened bearing element in contact with a sleeve mounted in the bore forming the said second bearing element.

BRIEF DESCRIPTION OF THE DRAWINGS

The different embodiments of the invention will now be described in greater detail in application to the contact surfaces of a variable-setting diffuser device of a gas turbine, with reference to the figures, in which.

DETAILED DESCRIPTION OF THE DRAWINGS

Figure 1:
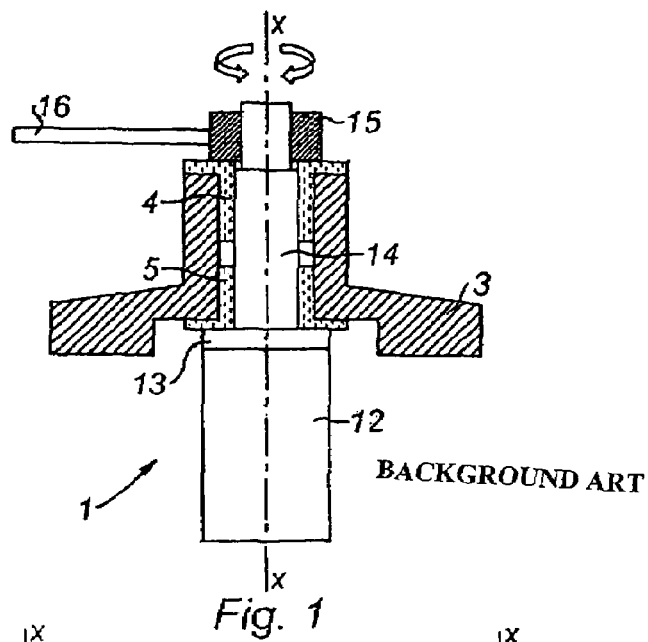
FIG. 1 shows schematically, in axial section, a variable-setting diffuser blade of a gas turbine mounted in the casing bore according to the prior art.

The assembly in FIG. 1 shows the prior art, and wear of the contact surfaces, particularly at the level of the platform 13, is observed. The contact surfaces are, for the blade, the surface of the pivot 14 and that of the platform, while for the casing they are the inner surfaces of the two sleeves 4 and 5. Since the vane 12 is swept by the gases flowing through the jet, it is subject to stresses parallel to the gas flow, but perpendicular to the axis XX of the blade. This gives rise to a torque which tends to make the blade swing perpendicularly to the axis XX. These stresses cause, in particular, wear due to friction of the platform, which bears in a non-uniform way on the sleeve 5 of the housing. As the wear increases, it not only leads to problems of operation of the mechanism, but also has an adverse effect on the retention of the blade in a correct position with respect to the gas flow, and on the aerodynamic efficiency of the machine. Maintenance operations are necessary.

Furthermore, the increase of the wear causes a significant warping of the diffuser. The diffusers are interconnected centrally by a ring. When all the diffusers are warped, the ring advances and comes into contact with the rotor. There is then a contact between the rotor and stator which is unacceptable. This leads to problems in the operation of the system, a potential engine fire, and the stoppage of the engine.

These problems are avoided according to the invention by reducing the wear of the contact surfaces. The invention is based on the finding that, in this example, the blade was made from an austenitic alloy, reference Z6NCT25 according to the Afnor standard, with a large-grained microstructure and Vickers hardness 330 (HV0.3), and that the band inside the sleeve 5 was made from a martensitic alloy with a small-grained microstructure having a higher Vickers hardness of 400 (HV0.3).

Prestressing shot blasting tests were then conducted, and it was found that the hardness of the material could be increased in this way.

Eight tests were conducted, using, respectively, conventional nozzle projection with 315 µm and 630 µm steel balls at two different intensities, ultrasound with two different ball diameters, and conventional projection with 425 µm ceramic balls at two different intensities.

| Variable-setting blade | Type of shot blasting | Balls | Deflection (Almen) | Pressure or amplitude |
|---|---|---|---|---|
| 1 | conventional | BA315 | F21.5 | 3 bars |
| 2 | | | F15 A | 1.7 bar |
| 3 | ultrasonic | 3 mm | | 80 µm |
| 4 | | 2 mm | | |
| 5 | | BA630 | F25 A | |
| 6 | conventional | | F40 A | |
| 7 | | BC425 | F15 A | |
| 8 | | | F18 N | |

Figure 6:
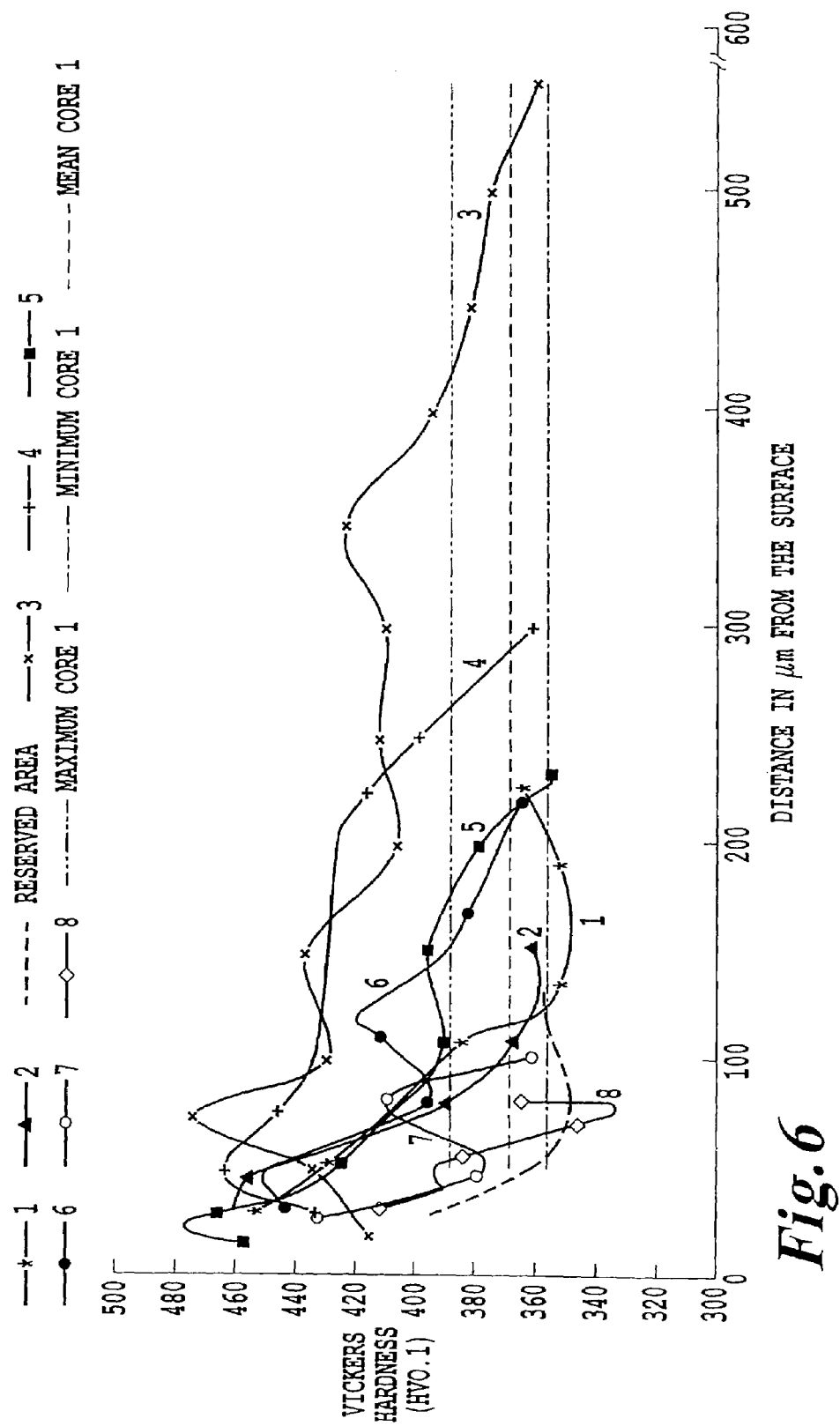
FIG. 6 is a diagram showing the hardness profiles obtained by shot blasting as a function of depth.

The Vickers hardness profiles found for HV0.1 microhardness as a function of the depth in the part are shown in the diagram of FIG. 6.

It can be seen that shot blasting enables the surface hardness of the material to be increased, while ultrasonic shot blasting shows a greater efficiency.

By means of shot blasting or another method of applying compression, the surface hardness of a first material is made equivalent to that of a second material of greater hardness.

The methods of applying compression which can be used for the purposes of the invention are listed below.

Conventional shot blasting consists in projecting spherical media on to the surface of a part by means of an air or water carrier, producing a directional jet approximately perpendicular to the surface and creating by impact a residual surface stress and an increase in hardness. The balls can consist of glass, ceramic, or cast or wrought steel.

In ultrasonic shot blasting, the surface of the treated part is subjected to multidirectional impacts by balls moved by means of an acoustic assembly, in a sealed enclosure.

The acoustic assembly consists of:
  a generator,
  a piezo-electric member which converts electrical energy into mechanical vibration,
  boosters which amplify and direct this deformation,
  a sonotrode designed to be deformed only in the Z axis. The balls come into contact with this component, thus receiving energy and becoming excited.

Laser shot blasting consists in subjecting the surface of a part to a laser beam with a power of several gigawatts for a few nanoseconds. The surface of the part, which is protected by an adhesive tape, is then covered with a film of still water. The contact between the water and the laser pulse creates a plasma which, at the moment of its explosion, generates a plane dynamic wave. The very rapid progression of the plane wave in the part generates the application of compression and the increase in hardness.

Burnishing consists in rolling a roller or ball over a surface under a mechanical or hydraulic pressure. This action increases the hardness by a strain-hardening process, and applies compression.

The solution of the invention can be applied in different ways.

Figure 2:
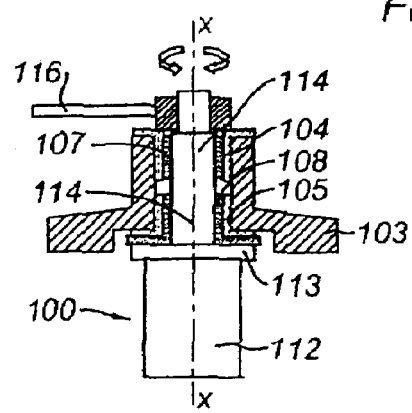
FIG. 2 shows the mounting of a variable-setting diffuser blade in a casing bore according to a first embodiment of the invention.

In the embodiment of FIG. 2, the blade 100 with its vane 112, the platform 113 and the pivot 114 is mounted in its housing formed in the casing 103. In this embodiment, the pivot may equally well be made from nickel, iron or titanium-based alloy. A lever 116 causes the blade to rotate about its pivot. The pivot 114 is provided with a cylindrical band 107 and a band 108 having a cylindrical part along the pivot and a disc-shaped part covering the platform 113. The bands 107 and 108 are made from steel and fixed to the pivot 114 with its platform. Externally, they form a first bearing element which is in contact with the sleeves 104 and 105 which are fixed to the bore formed in the casing. The insides of these sleeves form a second bearing element which is in contact with the first bearing element. According to the invention, the bands are made from steel, particularly austenitic steel, of the Z6NCT25 grade for example. The surface of the first element 107-108 has been hardened by strain hardening, using a method such as prestressing shot blasting as described above. The sleeves 104 and 105 are made from martensitic steel, for example Z12CNDV12 steel. The latter material has the advantage of being oxidized at temperatures above 200° C. and having a high hardness.

Figure 3:
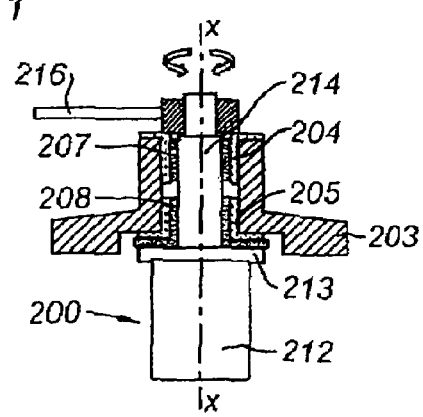
FIG. 3 shows the mounting of a variable-setting diffuser blade in a casing bore according to a second embodiment of the invention.

FIG. 3 shows a variant embodiment of the mounting of the diffuser blade in its housing formed in the casing. The references to the same elements have the same numerals, with the addition of 100. In this variant, the solution consists in exchanging the positions of the material of the bands 208 and 207, on the one hand, and the sleeves 204 and 205, on the other hand. In this case, the first bearing element is made from steel treated by strain hardening inside the sleeves. The bands are made from martensitic steel and form the second bearing elements. As in the preceding solution, the metal of the pivot 214 can equally well be an alloy of iron, of titanium, or of nickel.

Figure 4:
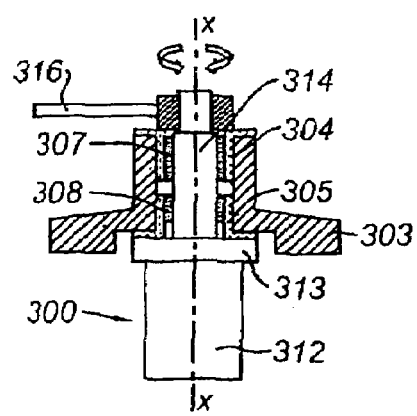
FIG. 4 shows the mounting of a variable-setting diffuser blade in a casing bore according to a third embodiment of the invention.

In the variant of FIG. 4, the corresponding elements have the same references as before, with the addition of 100. The three components, namely the vane 312, the platform 313 and the pivot 314, of the diffuser blade 300 are made from steel, particularly austenitic steel. The pivot 314 is covered with surface-hardened steel bands so as to form the said first bearing element which is strain-hardened. In this case, it can be seen that the surface of the platform 313 which comes into contact with the steel sleeve is treated directly in such a way that it also forms the said first bearing element. The two steel sleeves form a second bearing element.

Figure 5:
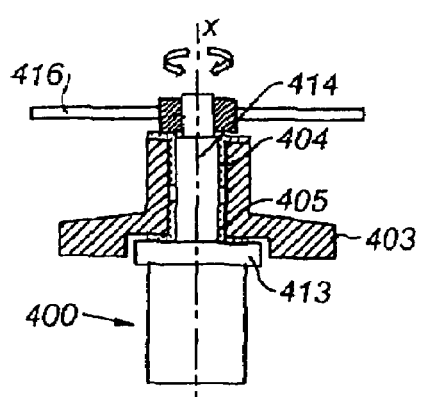
FIG. 5 shows the mounting of a variable-setting diffuser blade in a casing bore according to a fourth embodiment of the invention.

In the variant of FIG. 5, the corresponding elements have the same references as before, with the addition of 100. Here, the pivot 414 of the blade, being made from steel, has been surface-hardened by strain hardening, as has the platform 413. The surface of the pivot and the surface of the platform facing the sleeves 404 and 405 combine to form the said hardened first bearing element. As for the surfaces of the sleeves, these form the said second bearing element.

We claim:

1. A plain bearing between two parts movable with respect to each other, the bearing comprising:
   a first part including a first bearing element including a first metal;
   and a second part including a second bearing element including a second metal of higher hardness than a hardness of the first metal,
   wherein the first bearing element has a surface layer hardened by strain hardening, and
   the first metal of the first bearing element is an austenitic steel, and
   the second metal of the second bearing element is a martensitic steel, and
   wherein the first bearing element contacts the second bearing element in both a first direction and a second direction,
   the first direction being radially outward from an axis of the first part and the second direction being parallel to the axis of the first part.

2. The bearing according to claim 1, in which the strain hardening is achieved by a method of applying compression including ultrasonic or laser shot blasting, burnishing, or HIF banding.

3. The bearing according to claim 1, in which the first bearing element is heat-treated after it has been strain-hardened.

4. The bearing according to claim 1, in which at least one of the first or second bearing elements is covered with a layer of varnish, facilitating the running-in of the contact.

5. The bearing according to claim 4, in which the varnish is a graphite varnish.

6. The bearing according to claim 1, in which the first part comprises a pivot journaled in a bore formed in the second part.

7. The bearing according to claim 6, in which the pivot is fixed to a first and second band forming the said first bearing element, and the bore of a first and second sleeve forming the said second bearing element.

8. The bearing according to claim 6, in which the first part is a variable-setting diffuser blade and the second part is a gas turbine casing.

9. The bearing according to claim 8, in which the diffuser blade has a platform with a strain-hardened layer forming the said first bearing element in sliding contact with a sleeve in the bore forming the said second bearing element.

10. The bearing according to claim 8, in which the pivot of the diffuser blade comprises a strain-hardened layer forming the said first bearing element in sliding contact with a sleeve of the bore forming the said second bearing element.

11. The bearing according to claim 8, in which the first bearing element and the second bearing element are sandwiched between a platform of the diffuser blade and the gas turbine casing.

12. The bearing according to claim 11, in which the first bearing element directly contacts the platform of the diffuser blade.

13. The bearing according to claim 12, in which the second bearing element directly contacts the gas turbine casing.

14. The bearing according to claim 11, in which the second bearing element directly contacts the platform of the diffuser blade.

15. The bearing according to claim 14, in which the first bearing element directly contacts the gas turbine casing.

16. The bearing according to claim 8, in which the second bearing element is sandwiched between a platform of the diffuser blade and the gas turbine casing.

17. The bearing according to claim 6, in which the pivot is fixed to a band forming the said first bearing element, and the bore of a sleeve forming the said second bearing element.

18. The bearing according to claim 6, in which the pivot is fixed to a band forming the said second bearing element, and the bore of a sleeve forming the said first bearing element.

19. The bearing according to claim 6, in which the pivot is fixed to a first and second band forming the said second bearing element, and the bore of a first and second sleeve forming the said first bearing element.

20. The bearing according to claim 1, in which the first bearing element includes a first cylindrical hollow tube and a second cylindrical hollow tube, and the second bearing element includes a third cylindrical hollow tube and a fourth cylindrical hollow tube.

* * * * *